US012374221B2

(12) United States Patent
Kubo et al.

(10) Patent No.: US 12,374,221 B2
(45) Date of Patent: Jul. 29, 2025

(54) SERVICE SUPPORT APPARATUS, SYSTEM, AND SERVICE SUPPORT METHOD

(71) Applicant: TOYOTA JIDOSHA KABUSHIKI KAISHA, Toyota (JP)

(72) Inventors: Chikage Kubo, Chofu (JP); Kazuya Nishimura, Anjo (JP); Wataru Minoura, Nagoya (JP); Yuki Tatsumoto, Seto (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 18/191,931

(22) Filed: Mar. 29, 2023

(65) Prior Publication Data

US 2023/0316913 A1 Oct. 5, 2023

(30) Foreign Application Priority Data

Mar. 30, 2022 (JP) ................................ 2022-057712

(51) Int. Cl.
*G08G 1/123* (2006.01)

(52) U.S. Cl.
CPC .................................... *G08G 1/123* (2013.01)

(58) Field of Classification Search
None
See application file for complete search history.

(56) References Cited

U.S. PATENT DOCUMENTS

| | | | | |
|---|---|---|---|---|
| 11,604,463 | B1 * | 3/2023 | Trivedi | G05D 1/0297 |
| 11,816,725 | B2 * | 11/2023 | Jourdy | G06Q 10/02 |
| 2004/0054561 | A1 * | 3/2004 | Ogura | G06Q 10/02 705/5 |
| 2010/0245128 | A1 * | 9/2010 | Kanof | B62H 3/00 340/5.6 |
| 2013/0258107 | A1 * | 10/2013 | Delibaltov | G06V 20/54 348/148 |
| 2013/0317693 | A1 * | 11/2013 | Jefferies | G06Q 30/0645 701/31.5 |
| 2015/0294431 | A1 * | 10/2015 | Fiorucci | G07B 15/02 705/13 |
| 2016/0371607 | A1 * | 12/2016 | Rosen | G08G 1/141 |
| 2017/0344928 | A1 | 11/2017 | Shimura | |
| 2018/0156925 | A1 * | 6/2018 | Johns | G01S 5/01 |
| 2019/0164177 | A1 * | 5/2019 | Yeh | G06Q 30/0201 |
| 2019/0205797 | A1 * | 7/2019 | Sakurada | G07F 17/12 |
| 2020/0058065 | A1 * | 2/2020 | VanderZanden | G08G 1/202 |

(Continued)

FOREIGN PATENT DOCUMENTS

JP 2017215769 A 12/2017

*Primary Examiner* — Muhammad Adnan
(74) *Attorney, Agent, or Firm* — Dickinson Wright, PLLC

(57) ABSTRACT

A service support apparatus includes a communication interface configured to communicate with a terminal apparatus of a user or a staff member, and a controller configured to acquire status data indicating a parking status of shared vehicles at a plurality of locations, and transmit presentation data to the terminal apparatus via the communication interface upon detecting an excess of shared vehicles at a first location, a shortage of shared vehicles at a second location, or both based on the acquired status data, the presentation data encouraging the user or the staff member to travel to the second location in a shared vehicle parked at the first location.

15 Claims, 6 Drawing Sheets

(56) References Cited

U.S. PATENT DOCUMENTS

| | | | | |
|---|---|---|---|---|
| 2020/0258318 | A1* | 8/2020 | Endo | G08G 1/144 |
| 2020/0380798 | A1* | 12/2020 | Frankel | G08G 1/20 |
| 2021/0174683 | A1* | 6/2021 | Uchiyama | G08G 1/143 |
| 2023/0401642 | A1* | 12/2023 | Khallil | G06Q 30/0645 |

* cited by examiner

SERVICE SUPPORT APPARATUS, SYSTEM, AND SERVICE SUPPORT METHOD

CROSS-REFERENCE TO RELATED APPLICATION

This application claims priority to Japanese Patent Application No. 2022-057712 filed on Mar. 30, 2022, the entire contents of which are incorporated herein by reference.

TECHNICAL FIELD

The present disclosure relates to a service support apparatus, a system, and a service support method.

BACKGROUND

Patent Literature (PTL) 1 discloses a system for managing the status of staff members participating in a car sharing service.

CITATION LIST

Patent Literature

PTL 1: JP 2017-215769 A

SUMMARY

In one-way car sharing services, in which users can return vehicles to any location, the distribution of vehicles on standby tends to be uneven among locations.

It would be helpful to facilitate the elimination of an uneven distribution among locations where shared vehicles are parked.

A service support apparatus according to the present disclosure includes:

- a communication interface configured to communicate with a terminal apparatus of a user or a staff member; and
- a controller configured to acquire status data indicating a parking status of shared vehicles at a plurality of locations, and transmit presentation data to the terminal apparatus via the communication interface upon detecting an excess of shared vehicles at a first location, a shortage of shared vehicles at a second location, or both based on the acquired status data, the presentation data encouraging the user or the staff member to travel to the second location in a shared vehicle parked at the first location.

A service support method according to the present disclosure includes:

- acquiring, by a service support apparatus, status data indicating a parking status of shared vehicles at a plurality of locations; and
- transmitting presentation data from the service support apparatus to a terminal apparatus of a user or a staff member upon detecting an excess of shared vehicles at a first location, a shortage of shared vehicles at a second location, or both based on the acquired status data, the presentation data encouraging the user or the staff member to travel to the second location in a shared vehicle parked at the first location.

According to the present disclosure, it is easier to eliminate an uneven distribution among locations where shared vehicles are parked.

DETAILED DESCRIPTION

Figure 1:
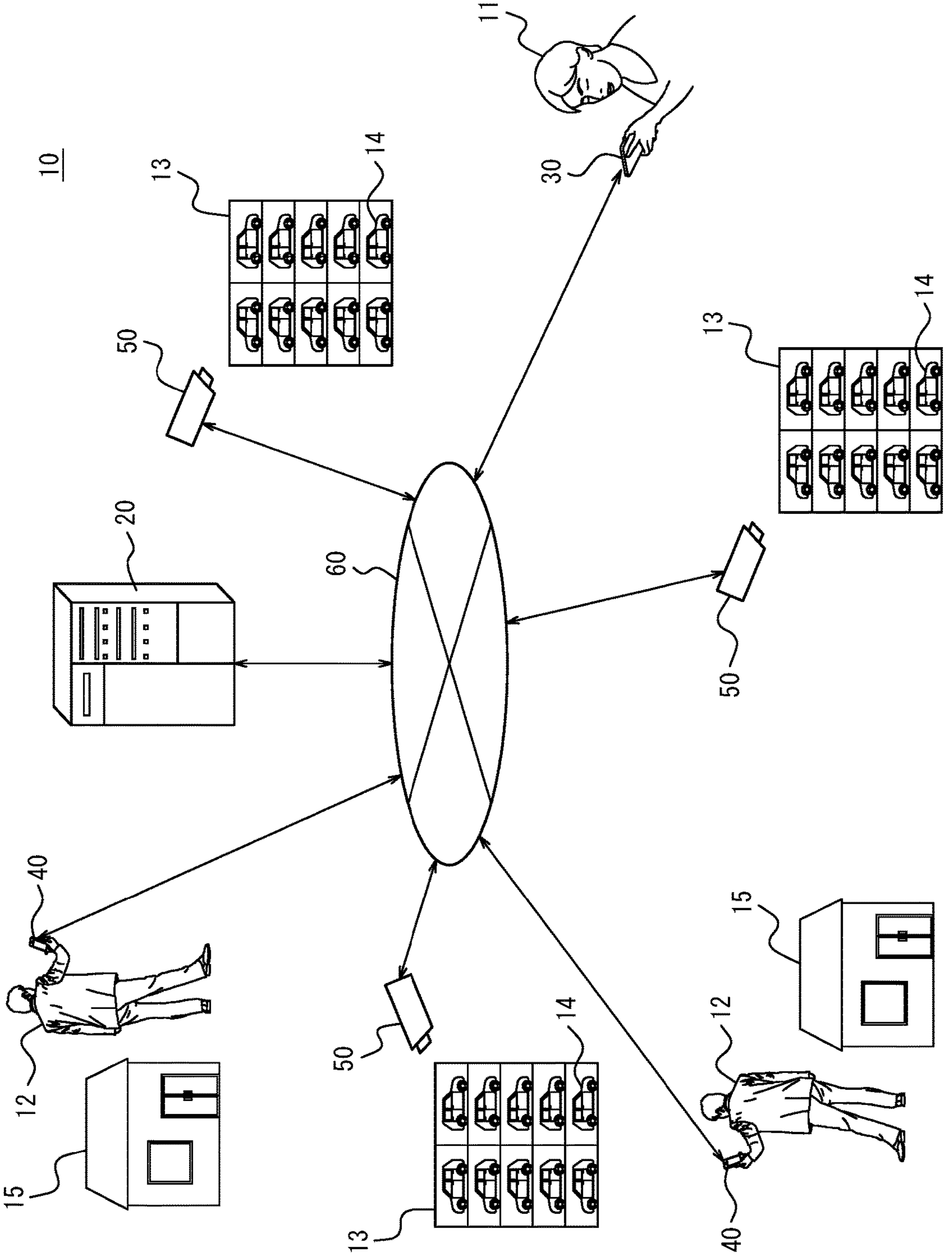
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes a service support apparatus 20, a first terminal apparatus 30, a second terminal apparatus 40, and an imaging apparatus 50. The service support apparatus 20 can communicate with the first terminal apparatus 30, the second terminal apparatus 40, and the imaging apparatus 50 via a network 60.

The service support apparatus 20 is installed in a facility such as a data center and is operated by a car sharing service provider. The service support apparatus 20 is a computer such as a server that belongs to a cloud computing system or another type of computing system.

The first terminal apparatus 30 is the terminal apparatus of a user 11 of the car sharing service. The first terminal apparatus 30 is held by the user 11 or installed at the home of the user 11 or another location and is used by the user 11. The first terminal apparatus 30 is, for example, a mobile device, such as a mobile phone, a smartphone, or a tablet, or is a PC. The term “PC” is an abbreviation of personal computer.

The second terminal apparatus 40 is the terminal apparatus of each staff member 12 of the car sharing service. The second terminal apparatus 40 is held by the staff member 12 or installed at the home 15 of the staff member 12 or another location and is used by the staff member 12. The second terminal apparatus 40 is, for example, a mobile device, such as a mobile phone, a smartphone, or a tablet, or is a PC.

The imaging apparatus 50 is installed at each location 13 of the car sharing service and captures images at each location 13. The imaging apparatus 50 is, for example, a camera such as an IP camera. The term “IP” is an abbreviation of Internet Protocol.

At each location 13, shared vehicles 14 are parked. The user 11 can start using a shared vehicle 14 from any location 13 and return the shared vehicle 14 to any location 13. When necessary, such as when the shared vehicles 14 parked among the locations 13 are unevenly distributed, each staff member 12 travels in a shared vehicle 14 parked at a certain first location L1, which is at least one location among the plurality of locations 13, to a second location L2, which is a different location than the first location L1 among the plurality of locations 13. The shared vehicle 14 is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle.

The network 60 includes the Internet, at least one WAN, at least one MAN, or any combination thereof. The term "WAN" is an abbreviation of wide area network. The term "MAN" is an abbreviation of metropolitan area network. The network 60 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

The service support apparatus 20 acquires status data D1 indicating the parking status of the shared vehicles 14 at the plurality of locations 13. Upon detecting an excess of shared vehicles 14 at the first location L1, a shortage of shared vehicles 14 at the second location L2, or both based on the acquired status data D1, the service support apparatus 20 transmits presentation data D2*a*, to the second terminal apparatus 40, encouraging the staff member 12 to travel to the second location L2 in a shared vehicle 14 parked at the first location L1. Alternatively, upon detecting an excess of shared vehicles 14 at the first location L1, a shortage of shared vehicles 14 at the second location L2, or both based on the acquired status data D1, the service support apparatus 20 may transmit presentation data D2*b*, to the first terminal apparatus 30, encouraging the user 11 to travel to the second location L2 in a shared vehicle 14 parked at the first location L1.

According to the present embodiment, when there is an uneven distribution of shared vehicles 14 parked among the locations 13, the user 11 or staff member 12 can be encouraged to travel to the second location L2 in the shared vehicle 14 parked at the first location L1. Consequently, it is easier to eliminate an uneven distribution among the locations 13.

Figure 2:
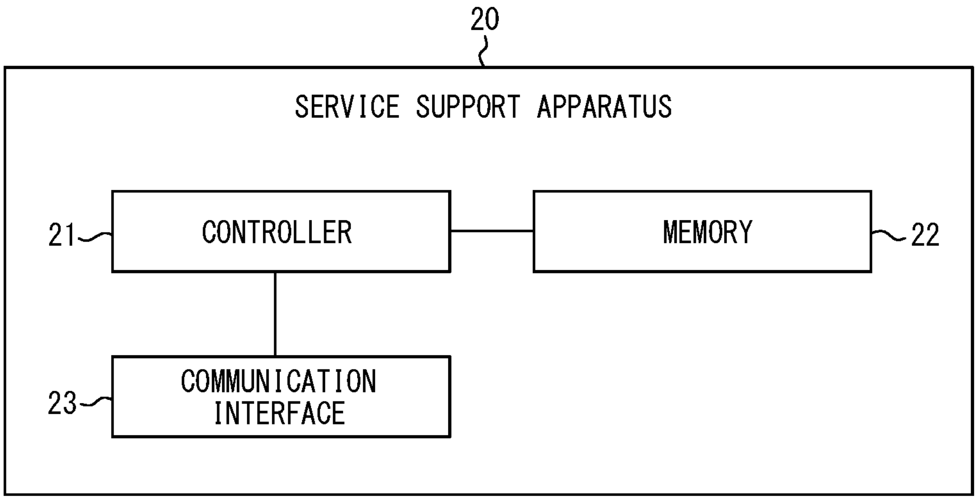
FIG. 2 is a block diagram illustrating a configuration of a service support apparatus according to the embodiment of the present disclosure.

A configuration of the service support apparatus 20 according to the present embodiment will be described with reference to FIG. 2.

The service support apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the service support apparatus 20 while controlling components of the service support apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores data to be used for the operations of the service support apparatus 20 and data obtained by the operations of the service support apparatus 20.

The communication interface 23 includes at least one interface for communication. The interface for communication is, for example, an interface compliant with a wired LAN communication standard such as Ethernet® or a wireless LAN communication standard such as IEEE 802.11 (Ethernet is a registered trademark in Japan, other countries, or both). "IEEE" is an abbreviation of Institute of Electrical and Electronics Engineers. The communication interface 23 communicates with the first terminal apparatus 30, the second terminal apparatus 40, and the imaging apparatus 50. The communication interface 23 receives data to be used for the operations of the service support apparatus 20 and transmits data obtained by the operations of the service support apparatus 20.

The functions of the service support apparatus 20 are realized by execution of a program according to the present embodiment by a processor serving as the controller 21. That is, the functions of the service support apparatus 20 are realized by software. The program causes a computer to execute the operations of the service support apparatus 20, thereby causing the computer to function as the service support apparatus 20. That is, the computer executes the operations of the service support apparatus 20 in accordance with the program to thereby function as the service support apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the service support apparatus 20 may be realized by a programmable circuit or a dedicated circuit serving as the controller 21. That is, some or all of the functions of the service support apparatus 20 may be realized by hardware.

Operations of the service support apparatus 20 according to the present embodiment will be described with reference to FIG. 3. These operations correspond to a service support method according to the present embodiment.

In step S1, the controller 21 of the service support apparatus 20 acquires status data D1 indicating the parking status of the shared vehicles 14 at the plurality of locations 13. The status data D1 is specifically acquired by the following procedure.

The imaging apparatus 50 captures images at each location 13. For example, the imaging apparatus 50 captures images of spaces where shared vehicles 14 can be parked at each location 13. The imaging apparatus 50 transmits the data including the captured images as status data D1 to the service support apparatus 20 via a communication interface, of the imaging apparatus 50, compliant with a mobile communication standard such as LTE, 4G, or 5G, a wireless LAN communication standard such as IEEE 802.11, or a wired LAN communication standard such as Ethernet®. The term "LTE" is an abbreviation of Long Term Evolution. The term "4G" is an abbreviation of 4th generation. The term "5G" is an abbreviation of 5th generation. In addition to images captured at each location 13, the status data D1 may include a location ID that identifies each location 13. The term "ID" is an abbreviation of identifier. The controller 21 of the service support apparatus 20 receives the status data D1 from the imaging apparatus 50 via the communication interface 23.

In step S2, the controller 21 of the service support apparatus 20 detects an excess of shared vehicles 14 at the first location L1, a shortage of shared vehicles 14 at the second location L2, or both based on the status data D1 acquired in step S1. Alternatively, the controller 21 might detect neither an excess of shared vehicles 14 at the first location L1 nor a shortage of shared vehicles 14 at the second location L2, depending on the parking status indicated by the status data D1. In such a case, the operations illustrated in FIG. 3 are terminated.

Figure 4:
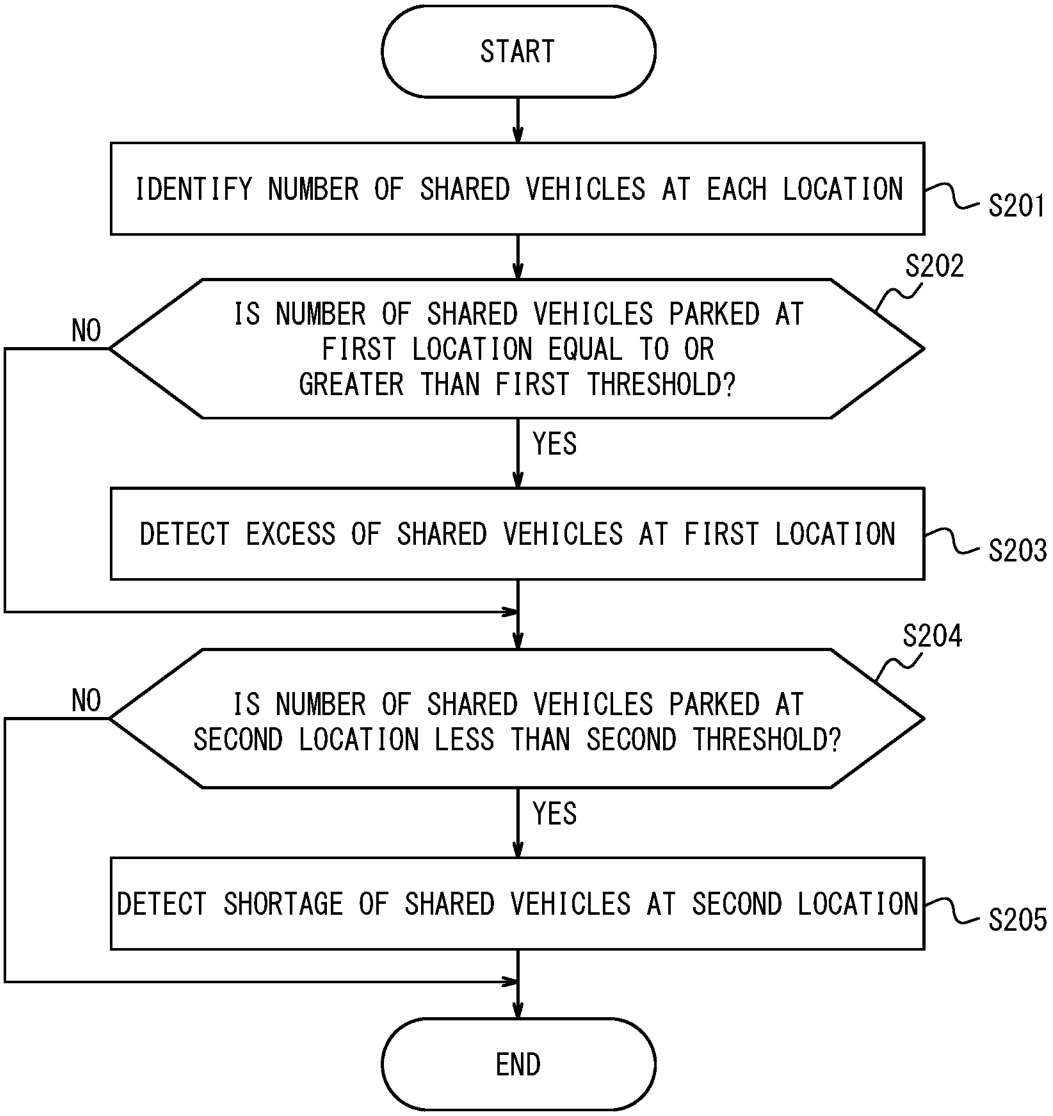
FIG. 4 is a flowchart illustrating the specific procedures of the process in step S2 of FIG. 3.

Specific procedures for the process of step S2 are illustrated in FIG. 4.

In step S201, the controller 21 of the service support apparatus 20 identifies the respective numbers of shared vehicles 14 parked at the plurality of locations 13 based on the status data D1 acquired in step S1. Specifically, the controller 21 identifies the respective numbers of shared vehicles 14 parked at the plurality of locations 13 by analyzing the images included in the status data D1. As the image analysis method, a known method can be used. Machine learning, such as deep learning, may be used. For example, if an image of a parking space for 10 vehicles is captured at the location Lx, and 8 vehicles appear in the image, the controller 21 identifies the number of shared vehicles 14 parked at the location Lx as "8". If an image of a parking space for 6 vehicles is captured at the location Ly, and 3 vehicles appear in the image, the controller 21 identifies the number of shared vehicles 14 parked at the location Ly as "3". If an image of a parking space for 10 vehicles is captured at the location Lz, and 4 vehicles appear in the image, the controller 21 identifies the number of shared vehicles 14 parked at the location Lz as "4".

In step S202, the controller 21 of the service support apparatus 20 determines, for each location 13, whether an excess of shared vehicles 14 has occurred according to whether the corresponding one of the numbers identified in step S201 is equal to or greater than a first threshold T1*a*. For example, if the first threshold T1*a* is "8", the number of shared vehicles 14 parked at the location Lx is "8", the number of shared vehicles 14 parked at the location Ly is "3", and the number of shared vehicles 14 parked at the location Lz is "4", then the controller 21 determines that the number of shared vehicles 14 parked at the location Lx is equal to or greater than the first threshold T1*a*.

In a case in which it is determined in step S202 that the number of shared vehicles 14 parked at the first location L1, which is at least one location among the plurality of locations 13, is equal to or greater than the first threshold T1*a*, the process of step S203 is performed. In a case in which it is determined in step S202 that the number of shared vehicles 14 parked at each location among the plurality of locations 13 is not equal to or greater than the first threshold T1*a*, the process of step S204 is performed.

In step S203, the controller 21 of the service support apparatus 20 detects an excess of shared vehicles 14 at the first location L1. For example, if it is determined in step S202 that the number of shared vehicles 14 parked at the location Lx is equal to or greater than the first threshold T1*a*, then the controller 21 detects an excess of shared vehicles 14 at the location Lx.

In step S204, the controller 21 of the service support apparatus 20 determines, for each location 13, whether a shortage of shared vehicles 14 has occurred according to whether the corresponding one of the numbers identified in step S201 is less than a second threshold T2*a*. For example, if the second threshold T2*a* is "4", the number of shared vehicles 14 parked at the location Lx is "8", the number of shared vehicles 14 parked at the location Ly is "3", and the number of shared vehicles 14 parked at the location Lz is "4", then the controller 21 determines that the number of shared vehicles 14 parked at the location Ly is less than the second threshold T2*a*.

In a case in which it is determined in step S204 that the number of shared vehicles 14 parked at the second location L2, which is a different location than the first location L1 among the plurality of locations 13, is less than the second threshold T2*a*, the process of step S205 is performed. In a case in which it is determined in step S204 that the number of shared vehicles 14 parked at each location among the plurality of locations 13 is not less than the second threshold T2*a*, the procedures illustrated in FIG. 4 are terminated.

In step S205, the controller 21 of the service support apparatus 20 detects a shortage of shared vehicles 14 at the second location L2. For example, if it is determined in step S204 that the number of shared vehicles 14 parked at the location Ly is less than the second threshold T2*a*, then the controller 21 detects a shortage of shared vehicles 14 at the location Ly.

Figure 5:
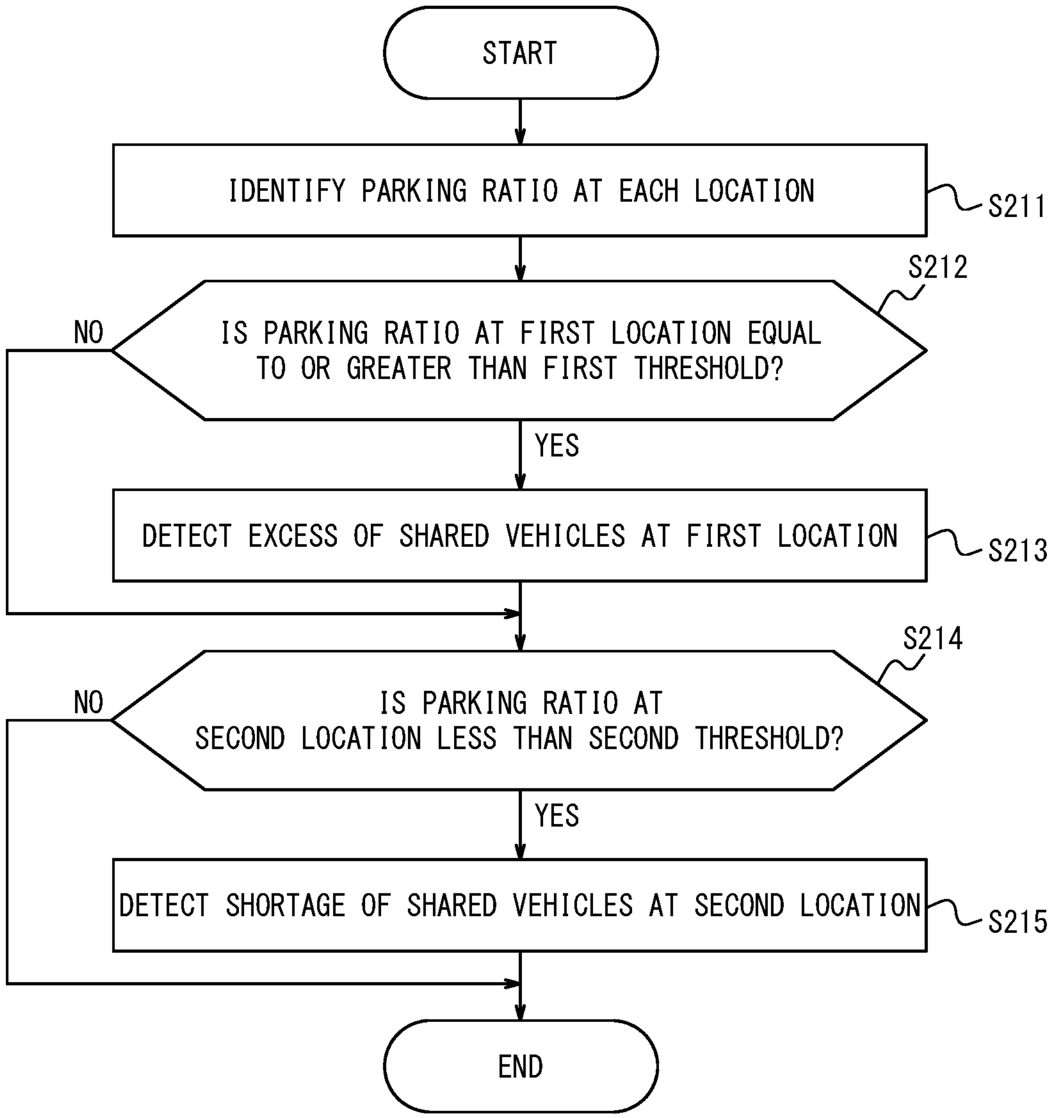
FIG. 5 is a flowchart illustrating a variation of the specific procedures of the process in step S2 of FIG. 3.

A variation of the specific procedures for the process of step S2 are illustrated in FIG. 5.

In step S211, the controller 21 of the service support apparatus 20 identifies the ratios of the respective numbers of shared vehicles 14 parked at the plurality of locations 13 to the respective parking capacities of the plurality of locations 13 as parking ratios based on the status data D1 acquired in step S1. Specifically, the controller 21 identifies the respective parking ratios at the plurality of locations 13 by analyzing the images included in the status data D1. As the image analysis method, a known method can be used. Machine learning, such as deep learning, may be used. For example, if an image of a parking space for 10 vehicles is captured at the location Lx, and 8 vehicles appear in the image, the controller 21 identifies the parking ratio at the location Lx as "80%". If an image of a parking space for 6 vehicles is captured at the location Ly, and 3 vehicles appear in the image, the controller 21 identifies the parking ratio at the location Ly as "50%". If an image of a parking space for 10 vehicles is captured at the location Lz, and 4 vehicles appear in the image, the controller 21 identifies the parking ratio at the location Lz as "40%".

In step S212, the controller 21 of the service support apparatus 20 determines, for each location 13, whether an excess of shared vehicles 14 has occurred according to whether the corresponding one of the parking ratios identified in step S211 is equal to or greater than a first threshold T1*b*. For example, if the first threshold T1*b* is "80%", the parking ratio at the location Lx is "80%", the parking ratio at the location Ly is "50%", and the parking ratio at the location Lz is "40%", then the controller 21 determines that the parking ratio at the location Lx is equal to or greater than the first threshold T1*b*.

In a case in which it is determined in step S212 that the parking ratio at the first location L1, which is at least one location among the plurality of locations 13, is equal to or greater than the first threshold T1*b*, the process of step S213 is performed. In a case in which it is determined in step S212 that the parking ratio at each location among the plurality of locations 13 is not equal to or greater than the first threshold T1*b*, the process of step S214 is performed.

In step S213, the controller 21 of the service support apparatus 20 detects an excess of shared vehicles 14 at the first location L1. For example, if it is determined in step S212 that the parking ratio at the location Lx is equal to or greater than the first threshold T1*b*, then the controller 21 detects an excess of shared vehicles 14 at the location Lx.

In step S214, the controller 21 of the service support apparatus 20 determines, for each location 13, whether a shortage of shared vehicles 14 has occurred according to whether the corresponding one of the parking ratios identified in step S211 is less than a second threshold T2*b*. For example, if the second threshold T2*b* is "50%", the parking ratio at the location Lx is "80%", the parking ratio at the location Ly is "50%", and the parking ratio at the location Lz is "40%", then the controller 21 determines that the parking ratio at the location Lz is less than the second threshold T2*b*.

In a case in which it is determined in step S214 that the parking ratio at the second location L2, which is a different location than the first location L1 among the plurality of locations 13, is less than the second threshold T2*b*, the process of step S215 is performed. In a case in which it is determined in step S214 that the parking ratio at each location among the plurality of locations 13 is not less than the second threshold T2*b*, the procedures illustrated in FIG. 5 are terminated.

In step S215, the controller 21 of the service support apparatus 20 detects a shortage of shared vehicles 14 at the second location L2. For example, if it is determined in step S214 that the parking ratio at the location Lz is less than the second threshold T2*b*, then the controller 21 detects a shortage of shared vehicles 14 at the location Lz.

The number of shared vehicles 14 or the parking ratio at each location 13 may be identified by using sensor data included in the status data D1 instead of being identified by analyzing the images included in the status data D1. In such a variation, the status data D1 includes sensor data, which is data acquired from sensors such as weight sensors installed in spaces where shared vehicles 14 can be parked at each location 13.

In step S3, the controller 21 transmits presentation data D2*a*, to the second terminal apparatus 40, encouraging the staff member 12 to travel to the second location L2 in the shared vehicle 14 parked at the first location L1. The presentation data D2*a* is specifically transmitted by the following procedure.

The controller 21 of the service support apparatus 20 determines the delivery staff member who is to move the shared vehicle 14 parked at the first location L1 to the second location L2 from among a plurality of staff members 12 according to the distance each staff member 12 travels to the first location L1 and the distance each staff member 12 travels from the second location L2. The controller 21 transmits data encouraging the delivery staff member to move the shared vehicle 14 parked at the first location L1 to the second location L2 as the presentation data D2*a* to the second terminal apparatus 40 of the delivery staff member via the communication interface 23. For example, if both an excess of shared vehicles 14 at the location Lx and a shortage of shared vehicles 14 at the location Ly are detected in step S2, then the controller 21 transmits data encouraging the delivery staff member to move a shared vehicle 14 parked at the location Lx to the location Ly as the presentation data D2*a*. Alternatively, if only an excess of shared vehicles 14 at the location Lx is detected in step S2, the controller 21 may transmit data, as the presentation data D2*a*, encouraging the delivery staff member to move a shared vehicle 14 parked at the location Lx to whichever of the locations Ly and Lz is closer to the location Lx, has fewer shared vehicles 14, has a lower parking ratio, or is selected by other criteria. Alternatively, if only a shortage of shared vehicles 14 at the location Ly is detected in step S2, the controller 21 may transmit data, as the presentation data D2*a*, encouraging the delivery staff member to move, to the location Ly, a shared vehicle 14 parked at whichever of the locations Lx and Lz is closer to the location Ly, has more shared vehicles 14, has a higher parking ratio, or is selected by other criteria. The second terminal apparatus 40 of the delivery staff member receives the presentation data D2*a* from the service support apparatus 20 via a communication interface, of the second terminal apparatus 40 of the delivery staff member, compliant with a mobile communication standard such as LTE, 4G, or 5G, a wireless LAN communication standard such as IEEE 802.11, or a wired LAN communication standard such as Ethernet®. The second terminal apparatus 40 of the delivery staff member displays the received presentation data D2*a* on a display, such as an LCD or organic EL, of the second terminal apparatus 40 of the delivery staff member. The term "LCD" is an abbreviation of liquid crystal display. The term "EL" is an abbreviation of electro luminescence.

Figure 6:
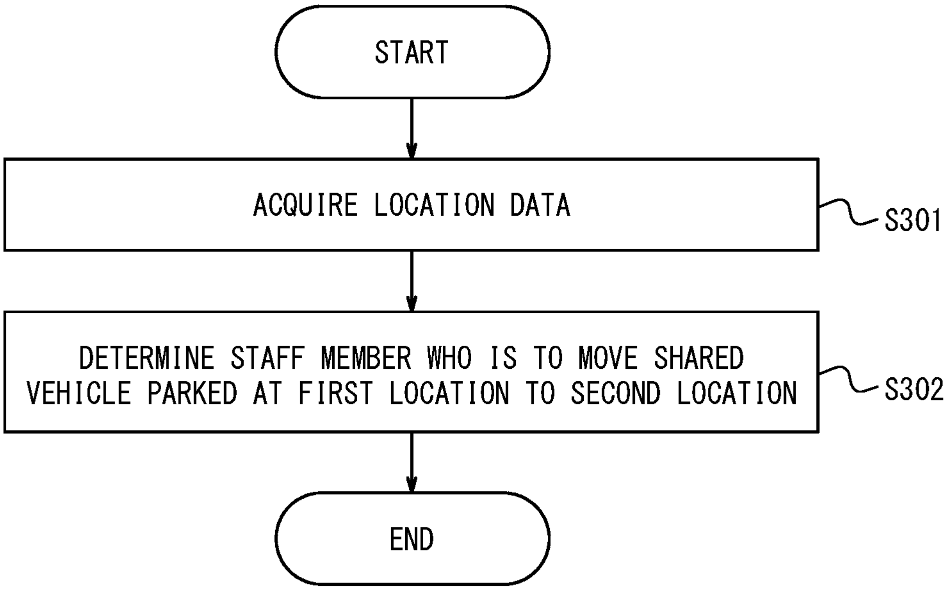
FIG. 6 is a flowchart illustrating the specific procedures of a portion of the process in step S3 of FIG. 3.

The specific procedures by which the delivery staff member is determined are illustrated in FIG. 6.

In step S301, the controller 21 of the service support apparatus 20 acquires location data D3 indicating the location of the home 15 of each staff member 12. The location data D3 is, for example, the address of the home 15 of each staff member 12 or data indicating two-dimensional or three-dimensional coordinates. The location data D3 may be received from the second terminal apparatus 40 via the communication interface 23 of the service support apparatus 20, stored in advance in the memory 22 of the service support apparatus 20, or acquired from an external system.

In step S302, the controller 21 of the service support apparatus 20 determines the delivery staff member according to the distance each staff member 12 travels from the home 15 to the first location L1 and from the second location L2 to the home 15 based on the location data D3 acquired in step S301. For example, the controller 21 determines the staff member 12 who has the shortest total of the travel distance from the location of the home 15 indicated by location data D3 to the first location L1 and the travel distance from the second location L2 to the location of the home 15 indicated by the location data D3 to be the delivery staff member.

In step S3, instead of transmitting the presentation data D2*a* to the second terminal apparatus 40, the controller 21 of the service support apparatus 20 may transmit the presentation data D2*b*, to the first terminal apparatus 30 via the communication interface 23, encouraging the user 11 to travel to the second location L2 in the shared vehicle 14 parked at the first location L1. The presentation data D2*b* is specifically transmitted by the following procedures.

The controller 21 of the service support apparatus 20 transmits data, as the presentation data D2*b*, to the first terminal apparatus 30 via the communication interface 23, the data encouraging the user 11 to reserve a shared vehicle 14 by specifying the first location L1 as the point at which the user 11 is to start using the shared vehicle 14 and the second location L2 as the point at which the user 11 is to return the shared vehicle 14. As such data, the presentation data D2*b* includes data indicating that, for example, the user 11 is to be granted an incentive upon reserving a shared vehicle 14 by specifying the first location L1 as the point at which the user 11 is to start using the shared vehicle 14 and the second location L2 as the point at which the user 11 is to return the shared vehicle 14. The incentive is, for example, a discount on the usage fee of the shared vehicle 14 or points that can be used when the user 11 buys a certain product or receives a certain service. For example, if both an excess of shared vehicles 14 at the location Lx and a shortage of shared vehicles 14 at the location Ly are detected in step S2, then the controller 21 transmits data, as the presentation data D2*b*, encouraging the user 11 to reserve a shared vehicle 14 by specifying the location Lx as the point at which the user 11 is to start using the shared vehicle 14 and the location Ly as the point at which the user 11 is to return the shared vehicle 14. Alternatively, if only an excess of shared vehicles 14 at the location Lx is detected in step S2, the controller 21 may transmit data, as the presentation data D2*b*, encouraging the user 11 to reserve a shared vehicle 14 by specifying the location Lx as the point at which the user 11 is to start using the shared vehicle 14 and whichever of the locations Ly and Lz is closer to the location Lx, has fewer shared vehicles 14, has a lower parking ratio, or is selected by other criteria as the point at which the user 11 is to return the shared vehicle 14. Alternatively, if only a shortage of shared vehicles 14 at the location Ly is detected in step S2, the controller 21 may transmit data, as the presentation data D2*b*, encouraging the user 11 to reserve a shared vehicle 14 by specifying whichever of the locations Lx and Lz is closer to the location Ly, has more shared vehicles 14, has a higher parking ratio, or is selected by other criteria as the point at which the user 11 is to start using the shared vehicle 14 and the location Ly as the point at which the user 11 is to return the shared vehicle 14. The first terminal apparatus 30 receives the presentation data D2*b* from the service support apparatus 20 via a communication interface, of the first terminal apparatus 30, compliant with a mobile communication standard such as LTE, 4G, or 5G, a wireless LAN communication standard such as IEEE 802.11, or a wired LAN communication standard such as Ethernet®. The first terminal apparatus 30 displays the received presentation data D2*b* on a display, such as an LCD or organic EL, of the first terminal apparatus 30.

The first terminal apparatus 30 may accept an operation, such as pressing a reservation button, via an input interface of the first terminal apparatus 30, such as a touch screen. In response to the operation, the first terminal apparatus 30 may transmit data, as request data D4, to the service support apparatus 20 via the communication interface of the first terminal apparatus 30, requesting reservation of a shared vehicle 14 by specifying the first location L1 as the point at which the user 11 is to start using the shared vehicle 14 and the second location L2 as the point at which the user 11 is to return the shared vehicle 14. Upon receiving the request data D4 from the first terminal apparatus 30 via the communication interface 23, the controller 21 of the service support apparatus 20 may perform processing to finalize reservation of the shared vehicle 14 by setting the first location L1 as the point at which the user 11 is to start using the shared vehicle 14 and the second location L2 as the point at which the user 11 is to return the shared vehicle 14 along with processing to provide an incentive to the user 11.

Figure 3:
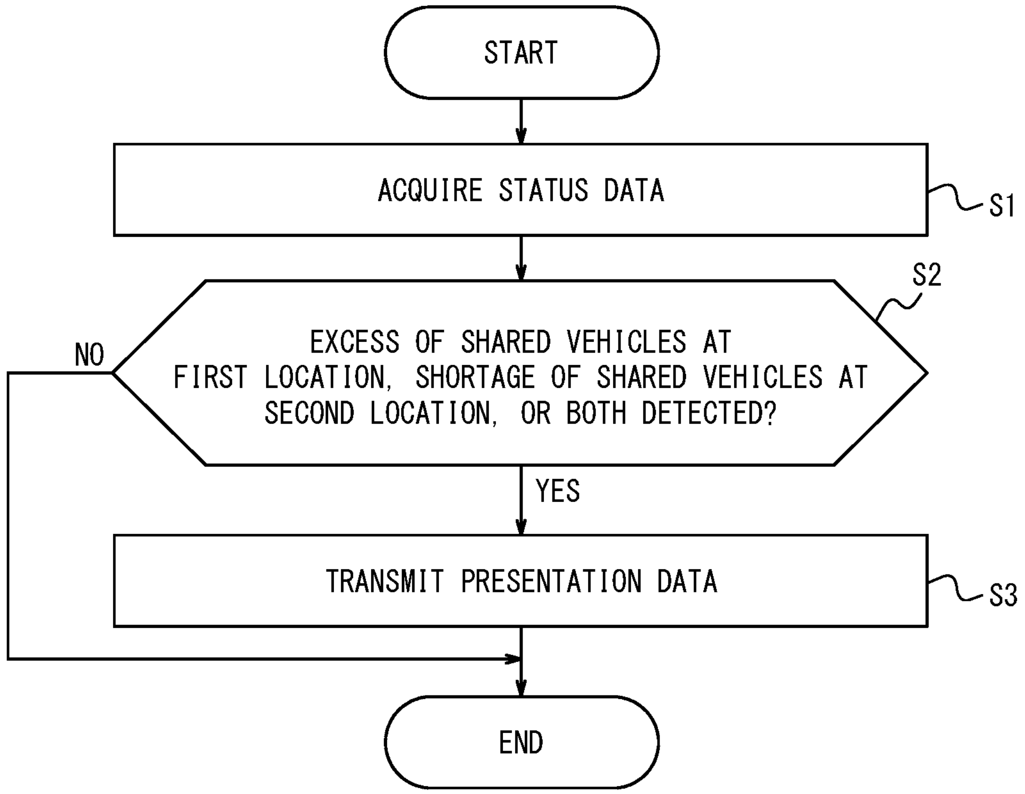
FIG. 3 is a flowchart illustrating operations of the service support apparatus according to the embodiment of the present disclosure.

The operations illustrated in FIG. 3 may be repeated periodically or may be performed as needed, such as when the parking status of shared vehicles 14 at any one location among the plurality of locations 13 changes.

As described above, in the present embodiment, the controller 21 of the service support apparatus 20 monitors the number of vehicles at each location 13 when providing a car sharing service that enables users 11 to return vehicles to any location 13, and upon detecting an uneven distribution among the locations 13, the controller 21 issues a request to a staff member 12, or the next user 11 to use the service, to equalize the number of vehicles on standby. In the case of issuing a request for equalization to a staff member 12, the controller 21 issues the request for equalization on a priority basis to the staff member 12 with a shorter total distance for travel to the first location L1 and travel from the second location L2. In the case of issuing a request for equalization to the user 11, the controller 21 displays on a reservation screen on the terminal apparatus of the user 11, for example, that an incentive will be granted if the user 11 makes a reservation by specifying the first location L1 as the start-of-use location and the second location L2 as the return location. The provided car sharing service may be a delivery car sharing service in which a staff member 12 delivers the vehicle to the user 11.

According to the present embodiment, the workload for equalizing the number of vehicles on standby among locations 13 can be reduced in a car sharing service that enables users 11 to return vehicles to any location 13.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. A service support apparatus comprising:

a communication interface configured to communicate with a terminal apparatus of a staff member; and a controller configured to acquire status data indicating a parking status of shared vehicles at a plurality of locations, and transmit presentation data to the terminal apparatus via the communication interface upon detecting an excess of shared vehicles at a first location, a shortage of shared vehicles at a second location, or both based on the acquired status data, the presentation data encouraging the staff member to travel to the second location in a shared vehicle parked at the first location;

wherein the presentation data is data encouraging the staff member to move the shared vehicle parked at the first location to the second location, and the controller is configured to determine the staff member who is to move the shared vehicle parked at the first location to the second location from among a plurality of staff members according to a distance each staff member travels to the first location and a distance each staff member travels from the second location.

2. The service support apparatus according to claim 1, wherein the controller is configured to acquire location data indicating a location of a home of each staff member and to determine the staff member who is to move the shared vehicle parked at the first location to the second location according to a distance each staff member travels from the home to the first location and a distance each staff member travels from the second location to the home based on the acquired location data.

3. A system comprising:

the service support apparatus according to claim 1; and the terminal apparatus.

4. The service support apparatus according to claim 1, wherein the controller is configured to detect the excess of shared vehicles at the first location by identifying respective numbers of shared vehicles parked at the plurality of locations based on the status data and determining, for each location, whether the excess of shared vehicles has occurred according to whether a corresponding one of the identified numbers is equal to or greater than a first threshold.

5. The service support apparatus according to claim 4, wherein the status data includes images captured at the plurality of locations, and the controller is configured to identify the respective numbers of shared vehicles parked at the plurality of locations by analyzing the images included in the status data.

6. The service support apparatus according to claim 1, wherein the controller is configured to detect the shortage of shared vehicles at the second location by identifying respective numbers of shared vehicles parked at the plurality of locations based on the status data and determining, for each location, whether the shortage of shared vehicles has occurred according to whether a corresponding one of the identified numbers is less than a second threshold.

7. The service support apparatus according to claim 6, wherein the status data includes images captured at the plurality of locations, and the controller is configured to identify the respective numbers of shared vehicles parked at the plurality of locations by analyzing the images included in the status data.

8. The service support apparatus according to claim 1, wherein the controller is configured to detect the excess of shared vehicles at the first location by identifying ratios of respective numbers of shared vehicles parked at the plurality of locations to respective parking capacities of the plurality of locations as parking ratios based on the status data and determining, for each location, whether the excess of shared vehicles has occurred according to whether a corresponding one of the identified parking ratios is equal to or greater than a first threshold.

9. The service support apparatus according to claim 8, wherein the status data includes images captured at the plurality of locations, and the controller is configured to identify the parking ratios at the plurality of locations by analyzing the images included in the status data.

10. The service support apparatus according to claim 1, wherein the controller is configured to detect the shortage of shared vehicles at the second location by identifying ratios of respective numbers of shared vehicles parked at the plurality of locations to respective parking capacities of the plurality of locations as parking ratios based on the status data and determining, for each location, whether the shortage of shared vehicles has occurred according to whether a corresponding one of the identified parking ratios is less than a second threshold.

11. The service support apparatus according to claim 10, wherein the status data includes images captured at the plurality of locations, and the controller is configured to identify the parking ratios at the plurality of locations by analyzing the images included in the status data.

12. A service support method comprising:

acquiring, by a service support apparatus, status data indicating a parking status of shared vehicles at a plurality of locations;

transmitting presentation data from the service support apparatus to a terminal apparatus of a staff member upon detecting an excess of shared vehicles at a first location, a shortage of shared vehicles at a second location, or both based on the acquired status data, the presentation data encouraging the staff member to travel to the second location in a shared vehicle parked at the first location, wherein the presentation data is data encouraging the staff member to move the shared vehicle parked at the first location to the second location; and determining, by the service support apparatus, the staff member who is to move the shared vehicle parked at the first location to the second location from among a plurality of staff members according to a distance each staff member travels to the first location and a distance each staff member travels from the second location.

13. The service support method according to claim 12, further comprising:

acquiring, by the service support apparatus, location data indicating a location of a home of each staff member; and determining, by the service support apparatus, the staff member who is to move the shared vehicle parked at the first location to the second location according to a distance each staff member travels from the home to the first location and a distance each staff member travels from the second location to the home based on the acquired location data.

14. The service support method according to claim 12, wherein the transmitting includes identifying respective numbers of shared vehicles parked at the plurality of locations or parking ratios that are ratios of respective numbers of shared vehicles parked at the plurality of locations to respective parking capacities of the plurality of locations based on the status data, and determining, for each location, whether the excess of shared vehicles has occurred according to whether a corresponding one of the identified numbers or parking ratios is equal to or greater than a first threshold.

15. The service support method according to claim 12, wherein the transmitting includes identifying respective numbers of shared vehicles parked at the plurality of locations or parking ratios that are ratios of respective numbers of shared vehicles parked at the plurality of locations to respective parking capacities of the plurality of locations based on the status data, and determining, for each location, whether the shortage of shared vehicles has occurred according to whether a corresponding one of the identified numbers or parking ratios is less than a second threshold.

* * * * *